UNITED STATES PATENT OFFICE.

ELIZABETH A. JOHNSTON, OF PROVIDENCE, RHODE ISLAND.

HEALTH FOOD AND PROCESS OF MAKING SAME.

1,206,852.     Specification of Letters Patent.     Patented Dec. 5, 1916.

No Drawing.     Application filed August 4, 1916. Serial No. 113,129.

*To all whom it may concern:*

Be it known that I, ELIZABETH A. JOHNSTON, a citizen of the United States, residing at Providence, in the county of Providence and State of Rhode Island, have invented certain new and useful Improvements in Health Food and Processes of Making Same, of which the following is a specification.

My invention relates to an improved composition of matter or compound, and its essential objects are to improve the health and increase the strength of the person employing the same; to simulate coffee in appearance and taste; and to furnish a health food of maximum virtue with a minimum of ingredients simply compounded.

To the above ends primarily my invention consists in such novel ingredients and novel combinations of ingredients, and in such steps of combining the same as fall within the scope of the appended claims.

In carrying out my invention a quart of sugar is mixed with a quart of boiling water, the sugar being introduced after the water reaches a boiling point. The mixture is boiled until it is of the consistency of a syrup. A peck of cracked Indian corn is thoroughly and repeatedly washed in water until all chaff and adhesions are removed. While the corn is still in a moist condition it is introduced into the syrup which is still in a boiling state. The mixture is stirred until the corn is thoroughly steamed through, which takes usually about an hour. The mixture is then cooled. Six eggs are thoroughly beaten and stirred into the mass. The mixture is then spread over the bottom of a pan to a uniform depth and placed in an oven until browned, and until it is of sufficient brittleness to facilitate the next step, which is to grind the baked mass through a mill. The period of baking is usually about three hours. The mass after grinding is a dark colored powder resembling in color a coffee.

The health food or coffee substitute thus produced is preferably prepared as a beverage in the usual manner for making coffee.

It will be obvious that various modifications of the method herein disclosed may be made within the scope of the claims without departing from the spirit of the invention.

I claim:—

1. The process of preparing a coffee substitute, consisting in boiling a cereal in a syrup until the cereal is steamed through, incorporating eggs in the mass, baking this mixture, and grinding.

2. A coffee substitute comprising a cooked and baked mixture of syrup, cereal, and eggs, reduced to a granular form.

3. The process of producing a food or coffee substitute as described consisting in melting sugar in boiling water to produce a syrup, introducing cracked Indian corn therein, next mixing beaten eggs with the mass, next baking the mixture thus produced, and finally reducing the baked mass to particles.

4. A coffee substitute comprising a baked mixture of syrup, cereal, and eggs, reduced to a granular form.

In testimony whereof I have affixed my signature.

ELIZABETH A. JOHNSTON.

Copies of this patent may be obtained for five cents each, by addressing the "Commissioner of Patents, Washington, D. C."